(12) United States Patent
Ock

(10) Patent No.: US 11,500,768 B2
(45) Date of Patent: Nov. 15, 2022

(54) STORAGE DEVICE PERFORMING GARBAGE COLLECTION AND METHOD OF OPERATING THE SAME

(71) Applicant: SK hynix Inc., Gyeonggi-do (KR)

(72) Inventor: Eun Jae Ock, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/000,622

(22) Filed: Aug. 24, 2020

(65) Prior Publication Data

US 2021/0318952 A1 Oct. 14, 2021

(30) Foreign Application Priority Data

Apr. 13, 2020 (KR) .......................... 10-2020-0044875

(51) Int. Cl.
  *G06F 12/02* (2006.01)
  *G06F 13/16* (2006.01)
  *G06F 12/0891* (2016.01)

(52) U.S. Cl.
  CPC ...... *G06F 12/0246* (2013.01); *G06F 12/0253* (2013.01); *G06F 12/0891* (2013.01); *G06F 13/1668* (2013.01)

(58) Field of Classification Search
  CPC ............. G06F 12/0246; G06F 12/0891; G06F 13/1668; G06F 12/0253
  See application file for complete search history.

(56) References Cited

U.S. PATENT DOCUMENTS

| 10,466,902 | B2* | 11/2019 | Shin | G11C 16/16 |
| 2016/0163381 | A1* | 6/2016 | Lee | G11C 11/5635 711/209 |
| 2016/0283369 | A1* | 9/2016 | Hada | G06F 12/0246 |
| 2017/0083436 | A1* | 3/2017 | Jung | G06F 12/0246 |
| 2017/0262228 | A1* | 9/2017 | Kanno | G11C 16/10 |
| 2018/0059977 | A1* | 3/2018 | Matsuyama | G06F 3/0653 |
| 2018/0211708 | A1* | 7/2018 | Igahara | G06F 3/0679 |
| 2019/0057041 | A1* | 2/2019 | Ha | G06F 11/3409 |
| 2019/0354476 | A1* | 11/2019 | Park | G06F 3/0655 |
| 2020/0183599 | A1* | 6/2020 | Byun | G06F 3/0652 |
| 2020/0257621 | A1* | 8/2020 | Pletka | G06F 3/0688 |
| 2021/0191853 | A1* | 6/2021 | Xu | G11C 16/30 |

FOREIGN PATENT DOCUMENTS

| KR | 10-1026634 | 4/2011 |
| KR | 10-2016-0143259 | 12/2016 |

* cited by examiner

*Primary Examiner* — Tasnima Matin
(74) *Attorney, Agent, or Firm* — IP & T Group LLP

(57) ABSTRACT

Provided herein may be a storage device and a method of operating the same. The storage device may include a memory device and a memory controller. The memory device may include first memory blocks and second memory blocks. The memory controller may be configured to control the memory device so that valid data stored in a victim block, among the first memory blocks, is stored in a target block, among the second memory blocks, based on a result of a comparison between an amount of valid data stored in the victim block and a reference value. Each of the first memory blocks may include memory cells each configured to store n bits, where n is a natural number of 2 or more. Each of the second memory blocks may include memory cells each configured to store m bits, where m is a natural number less than n.

18 Claims, 15 Drawing Sheets

FIG. 4B
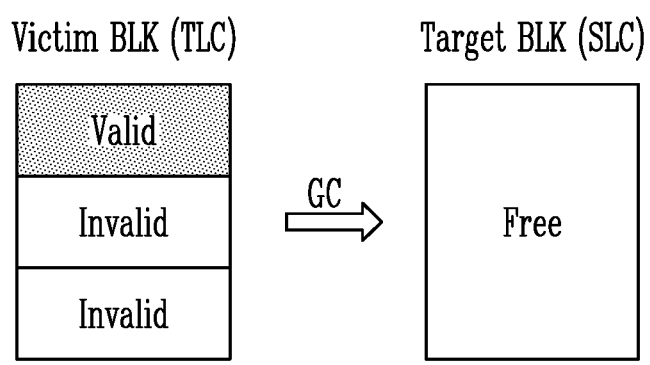
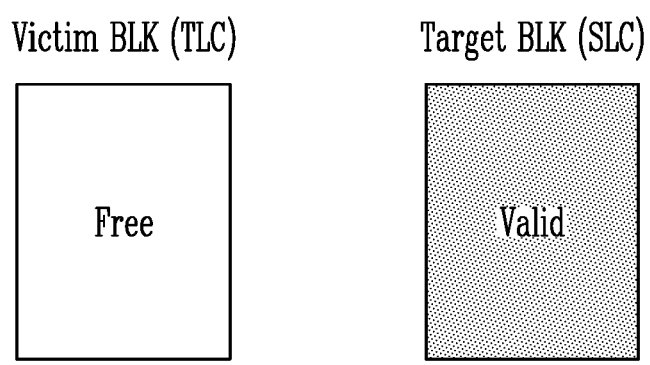

STORAGE DEVICE PERFORMING GARBAGE COLLECTION AND METHOD OF OPERATING THE SAME

CROSS-REFERENCE TO RELATED APPLICATION

The present application claims priority under 35 U.S.C. § 119(a) to Korean patent application number 10-2020-0044875, filed on Apr. 13, 2020, which is incorporated herein by reference in its entirety.

BACKGROUND

Field of Invention

Various embodiments of the present disclosure generally relate to an electronic device, and more particularly, to a storage device and a method of operating the storage device.

Description of Related Art

A storage device stores data under the control of a host device, such as a computer or a smartphone. The storage device may include a memory device in which data is stored and a memory controller which controls the memory device. Such memory devices are classified into a volatile memory device and a nonvolatile memory device.

A volatile memory device is a memory device in which data is stored only when power is supplied and in which stored data is lost when the supply of power is interrupted. Examples of the volatile memory device include a Static Random Access Memory (SRAM) and a Dynamic Random Access Memory (DRAM).

The nonvolatile memory device is a memory device in which stored data is retained even when the supply of power is interrupted. Examples of the nonvolatile memory device include a Read Only Memory (ROM), a Programmable ROM (PROM), an Electrically Programmable ROM (EPROM), an Electrically Erasable and Programmable ROM (EEPROM), and a flash memory.

SUMMARY

Various embodiments of the present disclosure are directed to a storage device having improved garbage collection performance and a method of operating the storage device.

An embodiment of the present disclosure may provide for a storage device. The storage device may include a memory device and a memory controller. The memory device may be configured to include first memory blocks and second memory blocks. The memory controller may be configured to control the memory device so that valid data stored in a victim block, among the first memory blocks, is stored in a target block, among the second memory blocks, based on a result of a comparison between an amount of valid data stored in the victim block and a reference value. Each of the first memory blocks may include memory cells each configured to store n bits, where n is a natural number of 2 or more. Each of the second memory blocks may include memory cells each configured to store m bits, where m is a natural number less than n.

An embodiment of the present disclosure may provide for a method of operating a storage device, which includes a memory device and a memory controller for controlling the memory device. The method may include selecting a victim block from among first memory blocks, based on a result of a comparison between an amount of valid data stored in the victim block and a reference value, and storing the valid data, stored in the victim block, in a target block, among second memory blocks. Each of the first memory blocks may include memory cells each configured to store n bits, where n is a natural number of 2 or more. Each of the second memory blocks may include memory cells each configured to store m bits, where m is a natural number less than n.

An embodiment of the present disclosure may provide for a memory system. The memory system may include a memory device and a memory controller. The memory device may be configured to include a user area and an over-provisioning area. The memory controller may be configured to determine a victim block having a valid page count less than a reference value among the first memory blocks in the user area, and to move data of the victim block into a target block among the second memory blocks in the over-provisioning area. Each of the user area and the over-provisioning area may include one or more first memory blocks and one or more second memory blocks. Each first memory block may store two or more bits of data. Each second memory block may store 1 bit of data.

BRIEF DESCRIPTION OF THE DRAWINGS

FIG. 4B is a diagram illustrating garbage collection according to an embodiment of the present disclosure.

DETAILED DESCRIPTION

Specific structural or functional descriptions in the embodiments of the present disclosure introduced in this specification or application are exemplified to describe embodiments according to the present disclosure. The embodiments of the present disclosure may be practiced in various forms, and should not be construed as being limited to the embodiments described in the specification or application.

Figure 1:
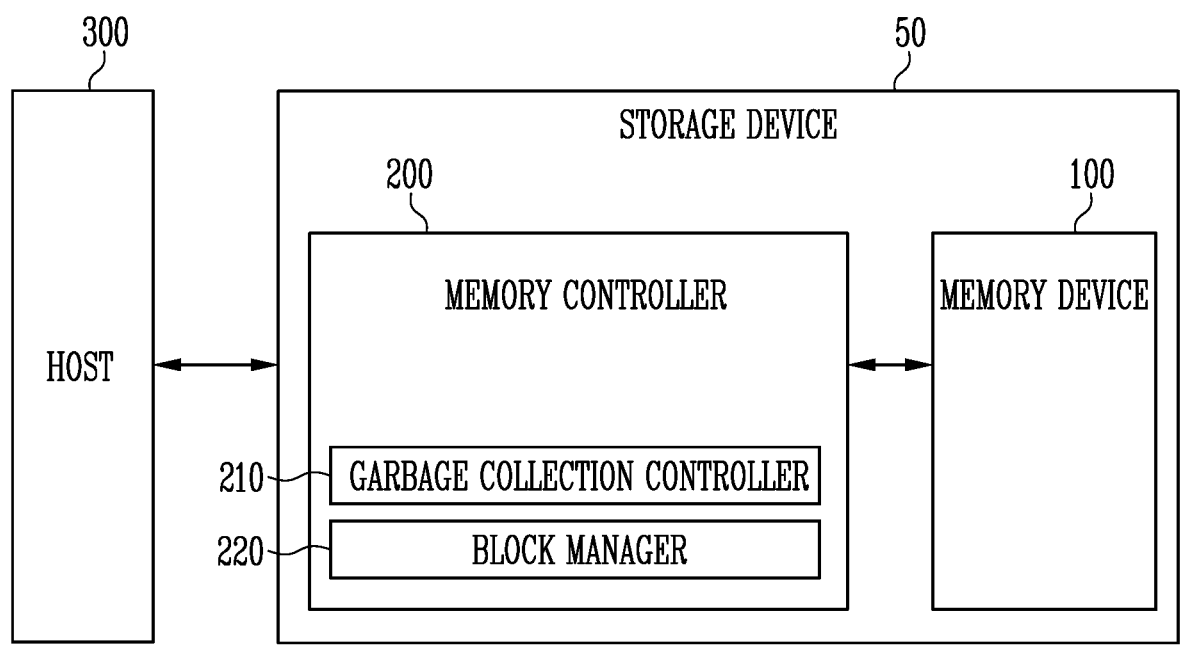
FIG. 1 is a diagram illustrating a storage device according to an embodiment of the present disclosure.

FIG. 1 is a diagram illustrating a storage device according to an embodiment of the present disclosure.

Referring to FIG. 1, a storage device 50 may include memory devices 100 and a memory controller 200. The storage device 50 may store data under the control of a host 300, such as a mobile phone, a smartphone, an MP3 player, a laptop computer, a desktop computer, a game console, a television (TV), a tablet personal computer (PC), or an in-vehicle infotainment system.

The storage device 50 may be manufactured as any one of various types of storage devices depending on a host interface that is a scheme for communication with the host 300. The storage device 50 may be implemented as any one of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-e or PCIe) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

Each memory device 100 may store data. The memory device 100 is operated in response to the control of the memory controller 200. The memory device 100 may include a memory cell array including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits. In an embodiment, each of the memory cells may be capable of storing five or more data bits.

The memory cell array may include a plurality of memory blocks. Each memory block may include a plurality of memory cells. One memory block may include a plurality of pages. In an embodiment, each page may be a unit by which data is stored in the memory device 100 or by which data stored in the memory device 100 is read.

A memory block may be a unit by which data is erased. In an embodiment, the memory device 100 may take many alternative forms, such as, but not limited to, a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). In the present disclosure, for convenience of description, a description will be made based on the memory device 100 being a NAND flash memory.

The memory device 100 may receive a command and an address from the memory controller 200, and may access the area of the memory cell array, selected by the address. That is, the memory device 100 may perform an operation indicated by the command on the area selected by the address. For example, the memory device 100 may perform a write operation (i.e., program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

In an embodiment, the memory device 100 may include first memory blocks. Each of the first memory blocks may include memory cells, each of which stores n bits (where n is a natural number of 2 or more). The memory device 100 may include second memory blocks. Each of the second memory blocks may include memory cells, each of which stores m bits (where m is a natural number less than n).

The memory device 100 may include a user area which stores data used by a user, and an over-provisioning area which is a reserved area required in order to maintain the operating performance of the storage device 50.

In an embodiment, the user area may include one or more memory blocks. For example, the user area may include one or more first memory blocks. The user area may include one or more second memory blocks. The user area may include one or more first memory blocks and one or more second memory blocks. In an embodiment, the over-provisioning area may include one or more memory blocks. For example, the over-provisioning area may include one or more first memory blocks. The over-provisioning area may include one or more second memory blocks. The over-provisioning area may include one or more first memory blocks and one or more second memory blocks.

In an embodiment, garbage collection may be an operation of storing valid data, stored in a victim block, in a target block. The victim block may be selected from among candidate victim blocks. The victim block may be a memory block in which the amount of valid data is less than or equal to a reference value, among the candidate victim blocks. The target block may be selected from among candidate target blocks. The target block may be a memory block which is a free block, among the candidate target blocks.

In an embodiment, the candidate victim blocks may be first memory blocks, for example, the first memory blocks of the user area. The candidate target blocks may be second memory blocks, for example, the second memory blocks of the over-provisioning area. In an embodiment, the number of candidate target blocks may be fixed at a set value. In an embodiment, the number of candidate target blocks may vary depending on the operating environment of the storage device 50.

In an embodiment, the user area may include candidate victim blocks which are the first memory blocks in the user area, and the over-provisioning area may include candidate target blocks which are the second memory blocks in the over-provisioning area. In an embodiment, the number of candidate target blocks included in the over-provisioning area may be fixed at a set value.

The memory controller 200 controls the overall operation of the storage device 50.

When power is applied to the storage device 50, the memory controller 200 may run firmware (FW). When the memory device 100 is a flash memory device, the memory controller 200 may run firmware such as a flash translation layer (FTL) for controlling communication between the host 300 and the memory device 100.

In an embodiment, the memory controller 200 may receive data and a logical block address (LBA) from the host 300, and may translate the logical block address into a physical block address (PBA) indicating the address of memory cells which are included in the memory device 100 and in which data is to be stored.

The memory controller 200 may control the memory device 100 so that a program operation, a read operation or an erase operation is performed in response to a request received from the host 300. During a program operation, the memory controller 200 may provide a write command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may autonomously generate a command, an address, and data regardless of a request from the host 300, and may transmit them to the memory device 100. For example, the memory controller 200 may provide commands, addresses, and data to the memory device 100 to perform background operations, such as a program operation for wear leveling and a program operation for garbage collection.

In an embodiment, the memory controller 200 may control at least two memory devices 100. In this case, the memory controller 200 may control the memory devices 100 depending on an interleaving scheme to improve operating performance. The interleaving scheme may be an operating manner in which the operating periods of the at least two memory devices 100 overlap each other.

In an embodiment, the memory controller 200 may include a garbage collection controller 210 and a block manager 220.

The garbage collection controller 210 may compare the amount of valid data, which is stored in a memory block selected from among first memory blocks, with a reference value. The garbage collection controller 210 may control the memory device 100 so that the valid data stored in the selected memory block is stored in a target block, among second memory blocks, based on the result of the comparison between the amount of valid data and the reference value.

The target block may be a memory block which is a free block, among the second memory blocks, for example, the second memory blocks of the over-provisioning area. The free block may be a memory block in which valid data is not stored. The free block may be a memory block in which only invalid data is stored. The free block may be used as a data block which stores data after being erased.

In an embodiment, the garbage collection controller 210 may select a memory block in which the amount of valid data is less than or equal to the reference value, as the victim block, from among candidate victim blocks which are the first memory blocks, for example, the first memory blocks of the user area. In an embodiment, the reference value may be the amount of data stored in one second memory block. The reference value is not limited to the present embodiment.

In an embodiment, the garbage collection controller 210 may select a memory block which is a free block, as the target block, from among candidate target blocks which are the second memory blocks.

The garbage collection controller 210 may control the memory device 100 so that the valid data stored in the victim block is stored in the target block.

In an embodiment, the garbage collection controller 210 may determine whether a free block is present among candidate target blocks which are the second memory blocks. When it is determined that no free block is present among the candidate target blocks, the garbage collection controller 210 may control the memory device 100 so that the valid data stored in the victim block is stored in an additional memory block other than the victim block, among the first memory blocks. Here, the additional memory block may be a free block, among the first memory blocks in the memory device 100.

In an embodiment, the garbage collection controller 210 may determine whether all of candidate target blocks which are the second memory blocks are data blocks. Each data block may be a memory block in which valid data is stored. When it is determined that all of the candidate target blocks are data blocks, the garbage collection controller 210 may control the memory device 100 so that the valid data stored in the victim block is stored in an additional memory block other than the victim block, among the first memory blocks. Here, the additional memory block may be a free block, among the first memory blocks in the memory device 100.

In an embodiment, the garbage collection controller 210 may determine whether a free block is present among candidate target blocks which are the second memory blocks in the over-provisioning area. When it is determined that no free block is present among the candidate target blocks, the garbage collection controller 210 may control the memory device 100 so that the valid data stored in the victim block is stored in an additional memory block other than the victim block, among the first memory blocks in the user area. Here, the additional memory block may be a free block, among the first memory blocks in the user area. In an embodiment, the number of candidate target blocks in the over-provisioning area may be fixed at a set value.

The user area and the over-provisioning area will be described in detail later with reference to FIG. 6.

The block manager 220 may store victim block information and target block information.

In an embodiment, the victim block information may be information about victim blocks in which the amount of valid data is less than or equal to the reference value, among the first memory blocks in the memory device 100. The target block information may be information about target blocks which are free blocks, among the second memory blocks in the memory device 100.

In an embodiment, the garbage collection controller 210 may select a victim block from among candidate victim blocks which are the first memory blocks, based on the victim block information provided from the block manager 220. The candidate victim blocks may be data blocks in which valid data is stored. In an embodiment, the garbage collection controller 210 may select a target block from among candidate target blocks which are the second memory blocks, based on the target block information provided from the block manager 220. The target block may be a free block.

The host 300 may communicate with the storage device 50 using at least one of various communication methods such as, but not limited to, Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
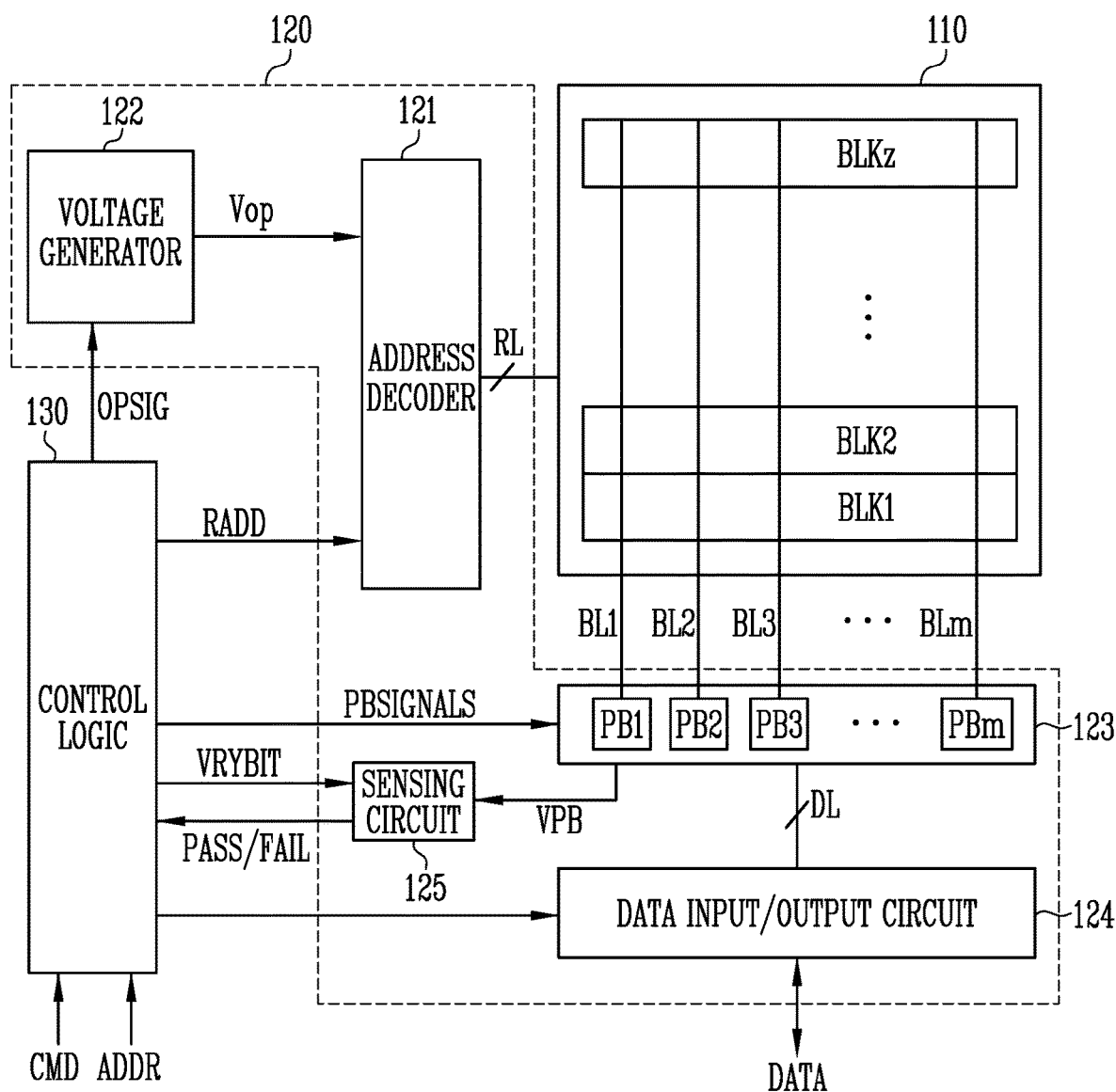
FIG. 2 is a diagram illustrating the structure of a memory device of FIG. 1.

FIG. 2 is a diagram illustrating the structure of the memory device of FIG. 1.

Referring to FIG. 2, the memory device 100 may include a memory cell array 110, a peripheral circuit 120, and a control logic 130. The peripheral circuit 120 may include an address decoder 121, a voltage generator 122, a read and write circuit 123, a data input/output circuit 124, and a sensing circuit 125.

The memory cell array 110 includes a plurality of memory blocks BLK1 to BLKz. The plurality of memory blocks BLK1 to BLKz are coupled to an address decoder 121 through row lines RL. The memory blocks BLK1 to BLKz are coupled to a read and write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line, among the plurality of memory cells, are defined as one physical page. In other words, the memory cell array 110 may include a plurality of physical pages. In an embodiment of the present disclosure, each of the memory blocks BLK1 to BLKz in the memory cell array 110 may include a plurality of dummy cells. For the dummy cells, one or more dummy cells may be coupled in series between a drain select transistor and memory cells, and between a source select transistor and memory cells.

Each of the memory cells of the memory device 100 may be implemented as a single-level cell (SLC) capable of storing one bit of data, a multi-level cell (MLC) capable of storing two bits of data, a triple-level cell (TLC) capable of storing three bits of data, or a quad-level cell (QLC) capable of storing four bits of data. In an embodiment, each of the memory cells may be capable of storing five or more bits of data.

The peripheral circuit 120 may drive the memory cell array 110. For example, the peripheral circuit 120 may drive the memory cell array 110 to perform a program operation, a read operation, and an erase operation.

The address decoder 121 is coupled to the memory cell array 110 through the row lines RL. The row lines RL may include drain select lines, word lines, source selection lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may be operated under the control of the control logic 130. The address decoder 121 receives addresses ADDR from the control logic 130.

The address decoder 121 may decode a block address, among the received addresses ADDR. The address decoder 121 may select at least one of the memory blocks BLK1 to BLKz according to the decoded block address. The address decoder 121 may decode a row address among the received addresses ADDR. The address decoder 121 may select at least one of word lines of the selected memory block according to the decoded row address. The address decoder 121 may apply operating voltages Vop supplied from the voltage generator 122 to the selected word line.

During a program operation, the address decoder 121 may apply a program voltage to the selected word line and apply a pass voltage having a level lower than that of the program voltage to unselected word lines. During a program verify operation, the address decoder 121 may apply a verify voltage to the selected word line and apply a verify pass voltage having a level higher than that of the verify voltage to the unselected word lines.

During a read operation, the address decoder 121 may apply a read voltage to the selected word line and apply a read pass voltage having a level higher than that of the read voltage to the unselected word lines.

In accordance with an embodiment of the present disclosure, an erase operation of the memory device 100 is performed on a memory block basis. During an erase operation, the addresses ADDR input to the memory device 100 include a block address. The address decoder 121 may decode the block address and select at least one memory block according to the decoded block address. During the erase operation, the address decoder 121 may apply a ground voltage to word lines coupled to the selected memory block.

In accordance with an embodiment of the present disclosure, the address decoder 121 may decode a column address, among the received addresses ADDR. The decoded column address may be transferred to the read and write circuit 123. In an embodiment, the address decoder 121 may include components, such as a row decoder, a column decoder, and an address buffer.

The voltage generator 122 may generate a plurality of operating voltages Vop using an external supply voltage that is supplied to the memory device 100. The voltage generator 122 may be operated under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate the plurality of operating voltages Vop using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage to generate a plurality of operating voltages Vop having various voltage levels, and may generate the plurality of operating voltages Vop by selectively enabling the plurality of pumping capacitors under the control of the control logic 130.

The generated operating voltages Vop may be supplied to the memory cell array 110 by the address decoder 121.

The read and write circuit 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm are operated under the control of the control logic 130.

The first to m-th page buffers PB1 to PBm perform data communication with the data input/output circuit 124. During a program operation, the first to m-th page buffers PB1 to PBm receive data DATA to be stored through the data input/output circuit 124 and data lines DL.

During a program operation, the first to m-th page buffers PB1 to PBm may transfer the data DATA to be stored, received through the data input/output circuit 124, to selected memory cells through the bit lines BL1 to BLm when a program voltage is applied to a selected word line. Memory cells in a selected page are programmed based on the received data DATA. Memory cells coupled to a bit line to which a program permission voltage (e.g., a ground voltage) is applied may have increased threshold voltages. The threshold voltages of memory cells coupled to a bit line to which a program inhibit voltage (e.g., a supply voltage) is applied may be maintained. During a program verify operation, the first to m-th page buffers PB1 to PBm read the data DATA stored in the selected memory cells from the selected memory cells through the bit lines BL1 to BLm.

During a read operation, the read and write circuit 123 may read data DATA from the memory cells in the selected page through the bit lines BL, and may store the read data DATA in the first to m-th page buffers PB1 to PBm.

During an erase operation, the read and write circuit 123 may allow the bit lines BL to float. In an embodiment, the read and write circuit 123 may include a column select circuit.

The data input/output circuit 124 is coupled to the first to m-th page buffers PB1 to PBm through the data lines DL. The data input/output circuit 124 is operated in response to the control of the control logic 130.

The data input/output circuit 124 may include a plurality of input/output buffers (not illustrated) which receive input data DATA. During a program operation, the data input/output circuit 124 receives the data DATA to be stored from an external controller (e.g., the memory controller 200 of FIG. 1). During a read operation, the data input/output circuit 124 outputs the data DATA, received from the first to m-th page buffers PB1 to PBm in the read and write circuit 123, to the external controller.

During a read operation or a verify operation, the sensing circuit 125 may generate a reference current in response to an enable bit signal VRYBIT generated by the control logic 130, and may output a pass signal or a fail signal to the control logic 130 by comparing a sensing voltage VPB received from the read and write circuit 123 with a reference voltage generated by the reference current.

The control logic 130 may be coupled to the address decoder 121, the voltage generator 122, the read and write circuit 123, the data input/output circuit 124, and the sensing circuit 125. The control logic 130 may control the overall operation of the memory device 100. The control logic 130 may be operated in response to a command CMD transmitted from an external device.

The control logic 130 may control the peripheral circuit 120 by generating various types of signals in response to the command CMD and the addresses ADDR. For example, the control logic 130 may generate an operation signal OPSIG, addresses ADDR, read and write circuit control signals PBSIGNALS, and the enable bit signal VRYBIT in response to the command CMD and the addresses ADDR. The control logic 130 may output the operation signal OPSIG to the voltage generator 122, output the addresses ADDR to the address decoder 121, output the page buffer control signal PBSIGNALS to the read and write circuit 123, and output the enable bit signal VRYBIT to the sensing circuit 125. In addition, the control logic 130 may determine whether a verify operation has passed or failed in response to the pass or fail signal PASS or FAIL output from the sensing circuit 125.

Figure 3:
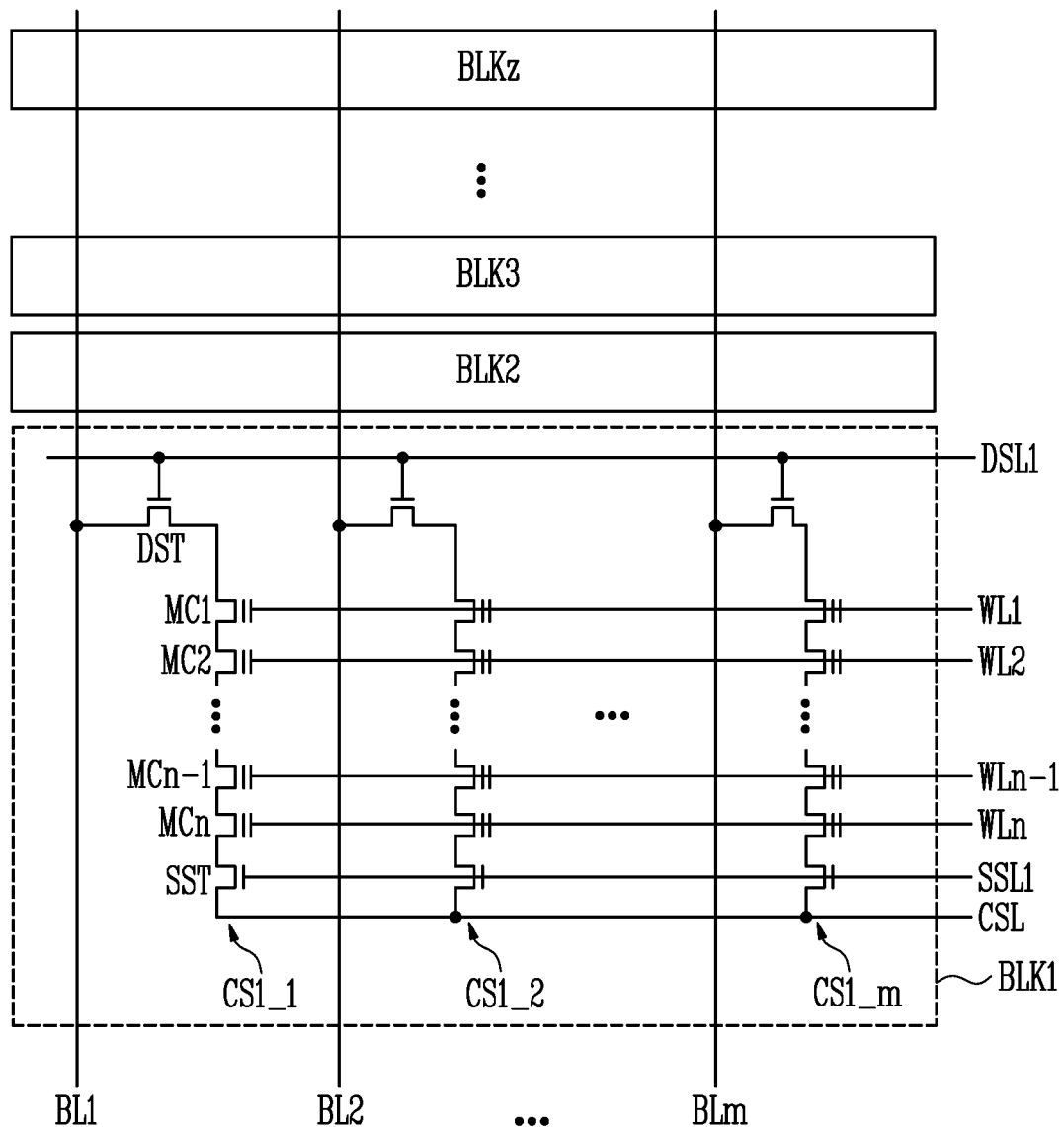
FIG. 3 is a diagram illustrating a memory cell array of FIG. 2.

FIG. 3 is a diagram illustrating the memory cell array of FIG. 2.

Referring to FIG. 3, the first to z-th memory blocks BLK1 to BLKz of the memory cell array 110 are coupled in common to the first to m-th bit lines BL1 to BLm. In FIG. 3, by way of example, elements in the first memory block BLK1, among the plurality of memory blocks BLK1 to BLKz, are illustrated, and illustration of elements in each of the remaining memory blocks BLK2 to BLKz is omitted. It will be understood that each of the remaining memory blocks BLK2 to BLKz has the same configuration as the first memory block BLK1.

The memory block BLK1 may include a plurality of cell strings CS1_1 to CS1_$m$ (where m is a positive integer). The first to m-th cell strings CS1_1 to CS1_$m$ are respectively coupled to the first to m-th bit lines BL1 to BLm. Each of the first to m-th cell strings CS1_1 to CS1_$m$ may include a drain select transistor DST, a plurality of memory cells MC1 to MCn (where n is a positive integer) which are coupled in series to each other, and a source select transistor SST.

A gate terminal of the drain select transistor DST in each of the first to m-th cell strings CS1_1 to CS1_$m$ is coupled to a drain select line DSL1. Gate terminals of the first to n-th memory cells MC1 to MCn in each of the first to m-th cell strings CS1_1 to CS1_$m$ are coupled to first to n-th word lines WL1 to WLn, respectively. A gate terminal of the source select transistor SST in each of the first to m-th cell strings CS1_1 to CS1_$m$ is coupled to a source select line SSL1.

By way of example, the structure of each cell string will be described based on the first cell string CS1_1, among the plurality of cell strings CS1_1 to CS1_$m$. However, it will be understood that each of the remaining cell strings CS1_2 to CS1_$m$ is configured in the same manner as the first cell string CS1_1.

A drain terminal of the drain select transistor DST in the first cell string CS1_1 is coupled to the first bit line BL1. A source terminal of the drain select transistor DST in the first cell string CS1_1 is coupled to a drain terminal of the first memory cell MC1 in the first cell string CS1_1. The first to n-th memory cells MC1 to MCn may be coupled in series to each other. A drain terminal of the source select transistor SST in the first cell string CS1_1 is coupled to a source terminal of the n-th memory cell MCn in the first cell string CS1_1. A source terminal of the source select transistor SST in the first cell string CS1_1 is coupled to a common source line CSL. In an embodiment, the common source line CSL may be coupled in common to the first to z-th memory blocks BLK1 to BLKz.

The drain select line DSL1, the first to n-th word lines WL1 to WLn, and the source select line SSL1 are included in the row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read and write circuit 123.

Figure 4A:
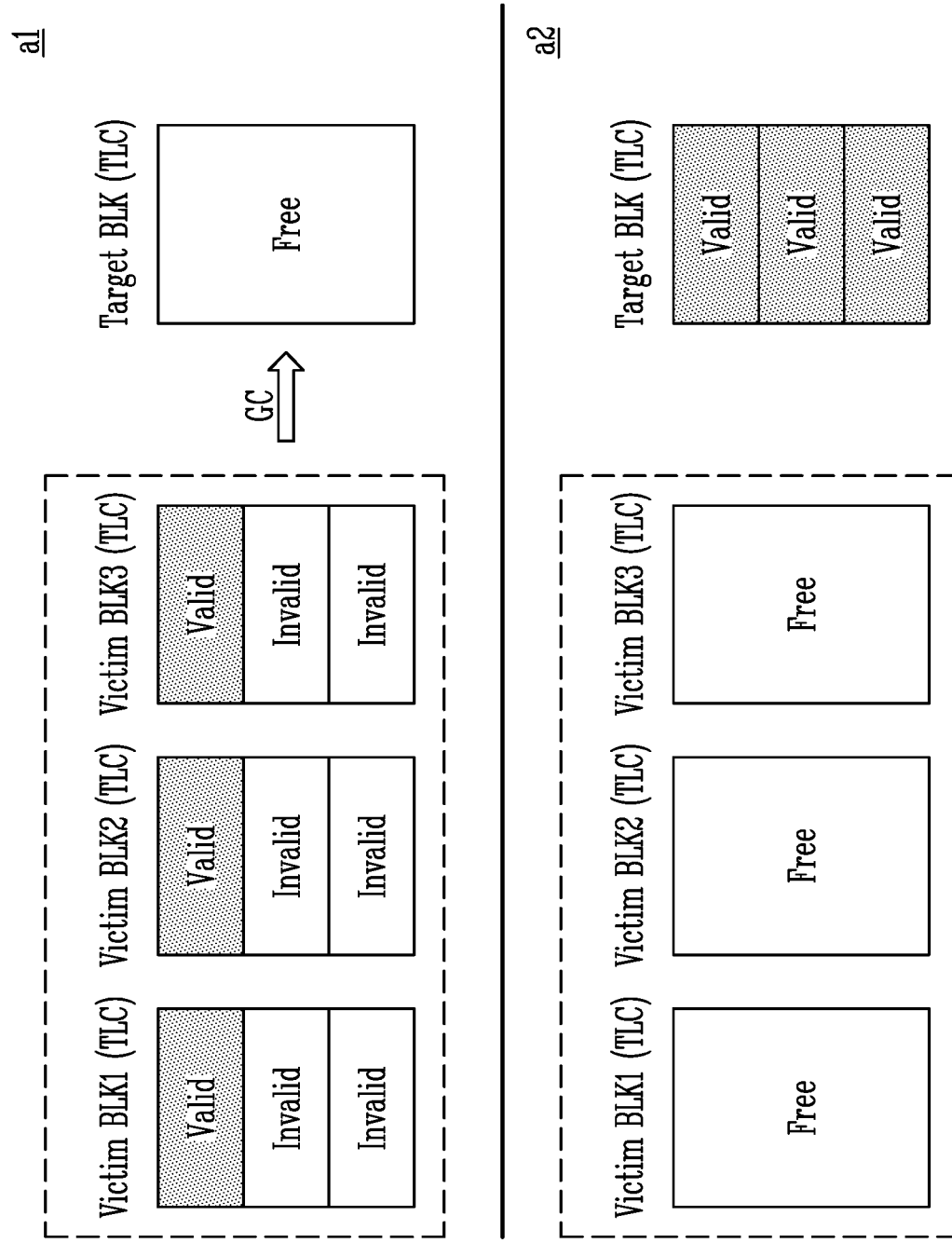
FIG. 4A is a diagram illustrating garbage collection according to an embodiment of the present disclosure.

FIG. 4A is a diagram illustrating garbage collection according to an embodiment.

Referring to FIG. 4A, by way of example, first to third victim blocks and a target block may be triple-level cell (TLC) blocks. The number of data bits stored in each of memory cells in the victim blocks and the target block is not limited to the present embodiment.

In state a1, through garbage collection (GC), valid data, stored in the first to third victim blocks, may be stored in the target block.

The first to third victim blocks may be memory blocks in which the amount of valid data is less than or equal to a reference value. In FIG. 4A, the reference value may be ⅓ of the total amount of data stored in each victim block.

Alternatively, the reference value may be ⅓ of the total amount of data stored in the target block. The reference value is not limited to the present embodiment.

The target block may be a free block. The free block may be a memory block in which valid data is not stored. The free block may be a memory block in which only invalid data is stored. The free block may be used as a data block which stores data after being erased.

State a2 may be the state after garbage collection has been performed. The valid data stored in the first to third victim blocks may be stored in the target block. The valid data stored in the first to third victim blocks may be changed to invalid data, and the first to third victim blocks may be changed to free blocks.

FIG. 4B is a diagram illustrating garbage collection according to an embodiment of the present disclosure.

Referring to FIG. 4B, by way of example, a victim block may be a triple-level cell (TLC) block, and a target block may be a single-level cell (SLC) block. The number of data bits stored in each of memory cells in the victim block and the target block is not limited to the present embodiment.

In state b1, through garbage collection, valid data stored in the victim block may be stored in the target block. The victim block may be a memory block in which the amount of valid data is less than or equal to a reference value. In FIG. 4B, the reference value may be ⅓ of the total amount of data stored in the victim block. Alternatively, the reference value may be the total amount of data stored in the target block. The reference value is not limited to the present embodiment.

State b2 may be the state after garbage collection has been performed. The valid data stored in the victim block may be stored in the target block. The valid data stored in the victim block may be changed to invalid data, and the victim block may be changed to a free block.

In accordance with the embodiment described with reference to FIG. 4B, in a case where the target block stores fewer data bits than the victim block, garbage collection may be performed faster than that in a case where the target block and the victim block store the same number of data bits.

In comparison with the embodiment of FIG. 4A, in the embodiment of FIG. 4B, the garbage collection may be immediately performed even when only one victim block is selected without needing to wait until three victim blocks are selected to perform garbage collection. Furthermore, since the target block is a single-level cell (SLC) block other than a triple-level cell (TLC) block, a data write speed is high, and thus a shorter time may be required for the garbage collection.

Figure 5:
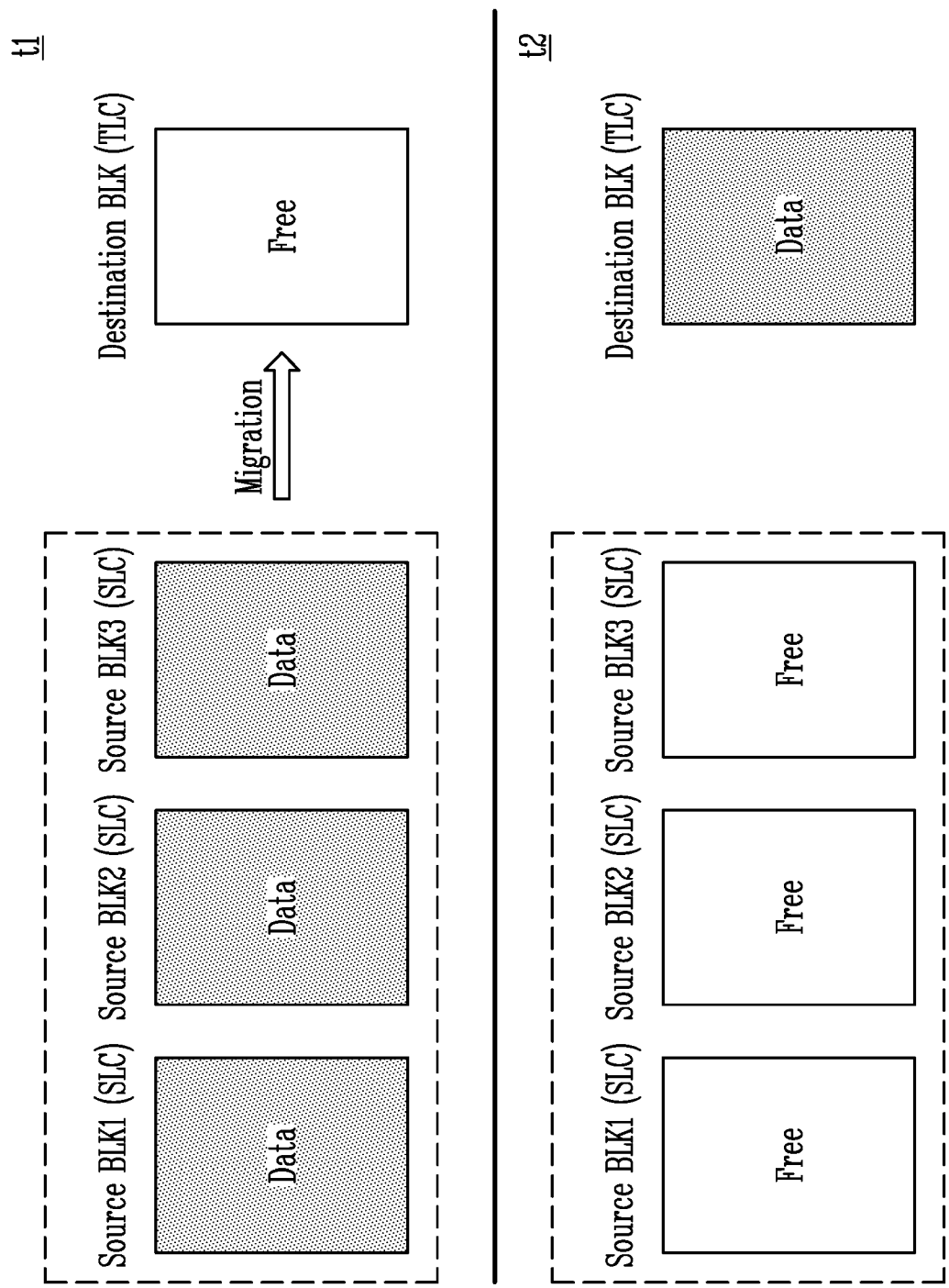
FIG. 5 is a diagram illustrating migration according to an embodiment of the present disclosure.

FIG. 5 is a diagram illustrating migration according to an embodiment of the present disclosure.

Referring to FIG. 5, by way of example, first to third source blocks may be single-level cell (SLC) blocks, and a destination block may be a triple-level cell (TLC) block.

In state t1, through migration, data stored in the first to third source blocks may be stored in the destination block which is a free block. The first to third source blocks may be data blocks in which valid data is stored.

State t2 may be the state after migration has been performed. The data stored in the first to third source blocks may be stored in the destination block. The first to third source blocks may be changed to free blocks.

Migration may be an operation of securing free blocks in source blocks by shifting the data, stored in the source blocks, to the destination block which stores more bits than the source blocks. In an embodiment, migration may be performed when the memory device is in an idle state.

Figure 6:
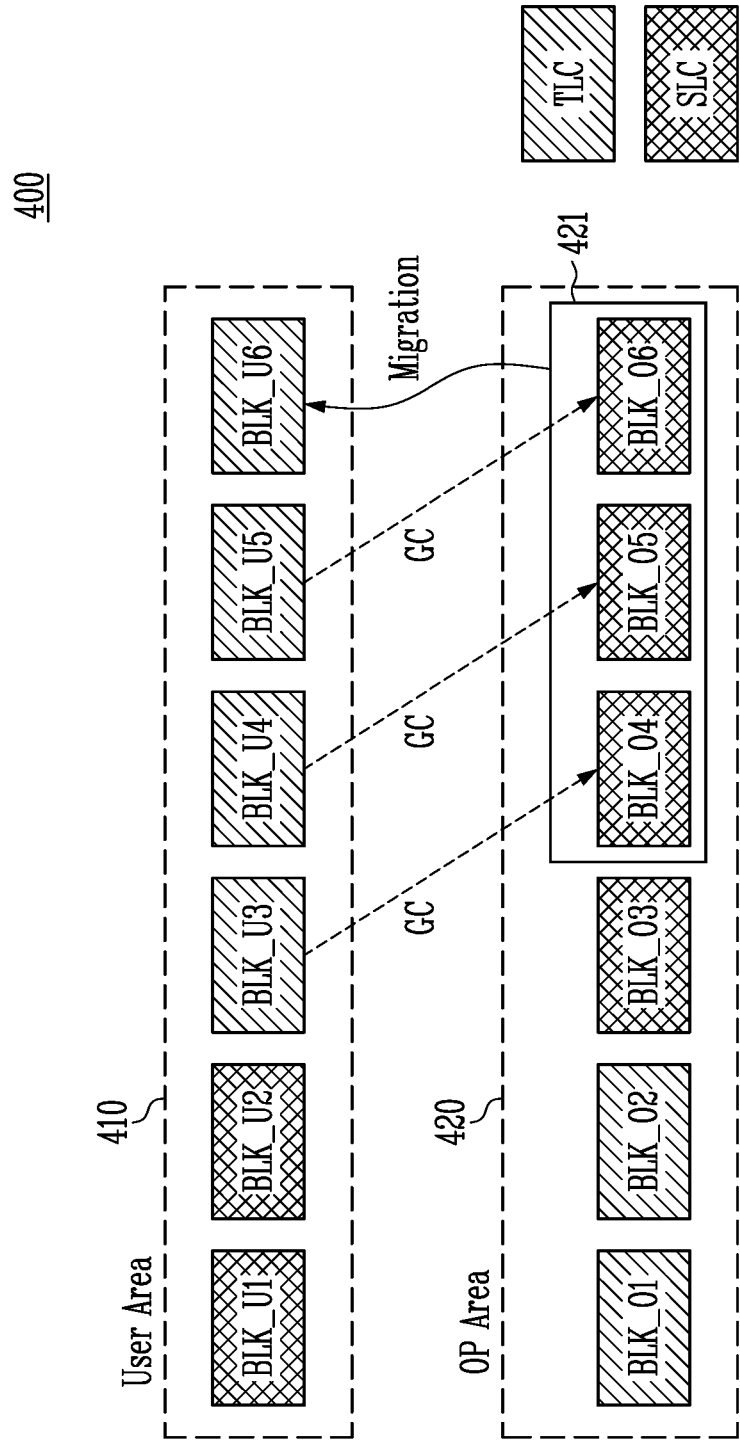
FIG. 6 is a diagram illustrating an embodiment of the memory device, such as that of FIG. 1.

FIG. 6 is a diagram illustrating an embodiment of the memory device, such as that of FIG. 1.

Referring to FIG. 6, a memory device 400 may include a user area 410 and an over-provisioning (OP) area 420. The user area 410 may be an area in which user data is stored, and the over-provisioning area 420 may be a reserved area which is required to maintain the performance of a storage device. For example, the over-provisioning area 420 may be the reserved area allocated such that various functions required to drive the storage device, such as wear leveling, garbage collection, and bad block management, are desirably operated.

In FIG. 6, the user area 410 and the over-provisioning area 420 may include one or more first memory blocks and one or more second memory blocks. Each first memory block may be a triple-level cell (TLC) block. Each second memory block may be a single-level cell (SLC) block. The number of bits stored in each memory block is not limited to the present embodiment.

The user area 410 may include first to sixth user blocks BLK_U1 to BLK_U6. The number of user blocks in the user area 410 is not limited to the present embodiment.

The first and second user blocks BLK_U1 and BLK_U2 may be second memory blocks. The third to sixth user blocks BLK_U3 to BLK_U6 may be first memory blocks. The numbers of first memory blocks and second memory blocks, among the user blocks, are not limited to the present embodiment.

The over-provisioning area 420 may include first to sixth reserved blocks BLK_O1 to BLK_O6. The number of reserved blocks in the over-provisioning area 420 is not limited to the present embodiment.

The first and second reserved blocks BLK_O1 and BLK_O2 may be first memory blocks. The third to sixth reserved blocks BLK_O3 to BLK_O6 may be second memory blocks. The numbers of first memory blocks and second memory blocks, among the reserved blocks, are not limited to the present embodiment.

The first to fifth user blocks BLK_U1 to BLK_U5 in the user area 410 may be data blocks in which valid data is stored. The sixth user block BLK_U6 may be a free block. The third to fifth user blocks BLK_U3 to BLK_U5 may be candidate victim blocks for garbage collection. Among the candidate victim blocks, since the amount of valid data in each of the third to fifth user blocks BLK_U3 to BLK_U5 is less than or equal to a reference value, the third to fifth user blocks BLK_U3 to BLK_U5 may be selected as victim blocks. In an embodiment, the reference value may be ⅓ of the total amount of data stored in the first memory block. Alternatively, the reference value may be the total amount of data stored in the second memory block. The reference value is not limited to the present embodiment.

In the over-provisioning area 420, the first to third reserved blocks BLK_O1 to BLK_O3 may be used to maintain the operating performance of the storage device. The over-provisioning area 420 may include a candidate target area 421 for garbage collection. The number of candidate target blocks in the candidate target area 421 may be fixed at a set value.

The candidate target area 421 may include the fourth to sixth reserved blocks BLK_O4 to BLK_O6 which are candidate target blocks. Since the fourth to sixth reserved blocks BLK_O4 to BLK_O6, among the candidate target blocks, are free blocks, they may be selected as target blocks.

In FIG. 6, as described above with reference to FIG. 4B, through garbage collection, valid data stored in the victim block may be stored in the target block which stores fewer data bits than the victim block.

Through garbage collection, valid data stored in the third user block BLK_U3 selected as the victim block is stored in the fourth reserved block BLK_O4 selected as the target block. Further, valid data stored in the fourth user block BLK_U4 selected as the victim block is stored in the fifth reserved block BLK_O5 selected as the target block. Furthermore, valid data stored in the fifth user block BLK_U5 selected as the victim block is stored in the sixth reserved block BLK_O6 selected as the target block.

Through migration, valid data stored in the target block, among candidate target blocks in the candidate target area 421, is stored in a free block of the user area 410, depending on whether the memory device is in an idle state. For example, when the memory device 400 is in an idle state, through migration, valid data stored in the fourth to sixth reserved blocks BLK_O4 to BLK_O6 which are data blocks of the candidate target area 421 is stored in the sixth user block BLK_U6 which is a free block of the user area 410.

In other embodiments, when a target block which is a free block is not present among the candidate target blocks in the candidate target area 421, valid data stored in the victim block is stored in the target block which stores a number of bits greater than or equal to the number of bits in the victim block, through garbage collection as described above with reference to FIG. 4A. In this case, unlike the embodiment illustrated in FIG. 6, garbage collection may be performed in which the valid data stored in the third to fifth user blocks BLK_U3 to BLK_U5 selected as the victim blocks in the user area 410 is stored in the sixth user block BLK_U6 which is the free block, rather than the victim block in the user area 410.

As described above with reference to FIG. 6, when an available free block is present in the candidate target area 421, a memory block which stores fewer bits than the victim block may be selected as the target block, and thus garbage collection may be performed faster. When an available free block is not present in the candidate target area 421, a memory block which stores a number of bits greater than or equal to the number of bits in the victim block is selected as the target block from the user area 410, thus preventing garbage collection from being frequently performed. That is, by operating the candidate target area 421 as a fixed area including a preset number of candidate target blocks, garbage collection may be performed faster, and may be prevented from being excessively frequently performed.

Figure 7:
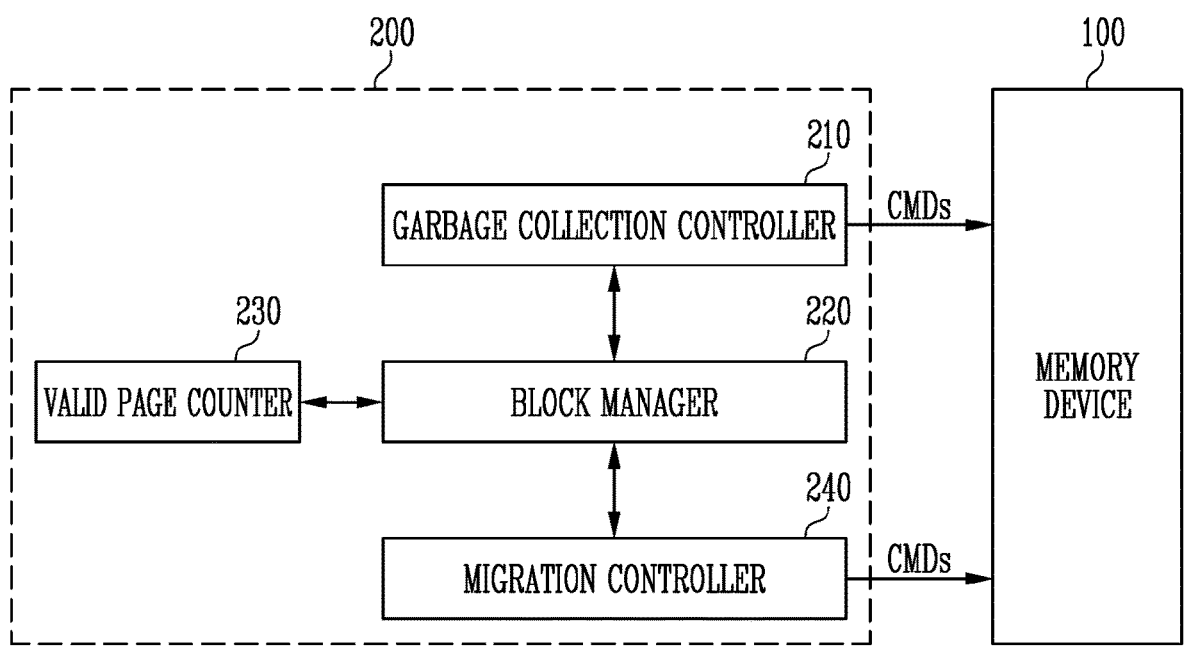
FIG. 7 is a diagram illustrating the configuration and operation of a memory controller, such as that of FIG. 1.

FIG. 7 is a diagram illustrating the configuration and operation of the memory controller 200 of FIG. 1.

Referring to FIG. 7, the memory controller 200 may be coupled to the memory device 100. The memory device 100 may include a user area which stores data used by a user, and an over-provisioning area which is a reserved area required in order to maintain the operating performance of the storage device.

In an embodiment, the user area may include one or more first memory blocks. The over-provisioning area may include one or more second memory blocks. Each first memory block may include memory cells, each of which stores n bits (where n is a natural number of 2 or more). Each second memory block may include memory cells, each of which stores m bits (where m is a natural number less than n).

In an embodiment, garbage collection may be an operation of storing valid data, stored in a victim block, in a target block. The victim block may be selected from among candidate victim blocks. The victim block may be a memory block in which the amount of valid data is less than or equal to a reference value, among the candidate victim blocks. The target block may be selected from among candidate target blocks. The target block may be a memory block which is a free block, among the candidate target blocks.

In an embodiment, the candidate victim blocks may be first memory blocks. The candidate target blocks may be second memory blocks. In an embodiment, the number of candidate target blocks may be fixed at a set value.

The memory controller 200 may include a garbage collection controller 210 and a block manager 220. The memory controller 200 may further include a valid page counter 230. The memory controller 200 may further include a migration controller 240.

The garbage collection controller 210 and the block manager 220 may be described in the same manner as that described above with reference to FIG. 1.

The garbage collection controller 210 may select a memory block in which the amount of valid data is less than or equal to a reference value, as the victim block, from among candidate victim blocks which are the first memory blocks. The garbage collection controller 210 may select a memory block which is a free block, as the target block, from among candidate target blocks which are the second memory blocks. The garbage collection controller 210 may provide a command for reading valid data stored in the victim block to the memory device 100. The garbage collection controller 210 may control the memory device 100 in response to the command for programming the read valid data to the target block.

The block manager 220 may store victim block information and target block information.

In an embodiment, the victim block information may be information about victim blocks in which the amount of valid data is less than or equal to the reference value, among the first memory blocks included in the memory device 100. The reference value may be the amount of data stored in one second memory block. The reference value is not limited to the present embodiment. The target block information may be information about target blocks which are free blocks, among the second memory blocks in the memory device 100.

The block manager 220 may update the victim block information and the target block information based on information about the amount of valid data stored in the memory blocks. In some embodiments, the information about the amount of valid data is received from the valid page counter 230.

The block manager 220 may provide information about free blocks, among the first memory blocks, and information about data blocks, among the second memory blocks, to the migration controller 240 based on the information about the amount of valid data stored in the memory blocks.

The valid page counter 230 may count the number of valid pages which store valid data, among a plurality of pages in each memory block. The valid page counter 230 may determine the amount of valid data stored in the corresponding memory block based on the count value for the valid pages. The valid page counter 230 may provide the information about the amount of valid data stored in the memory blocks to the block manager 220.

The migration controller 240 may control the memory device 100 so that migration of storing valid data, stored in the second memory blocks, in a first memory block which is a free block is performed depending on whether the memory device 100 is in an idle state. The free block may be secured among the second memory blocks through migration.

Figure 8:
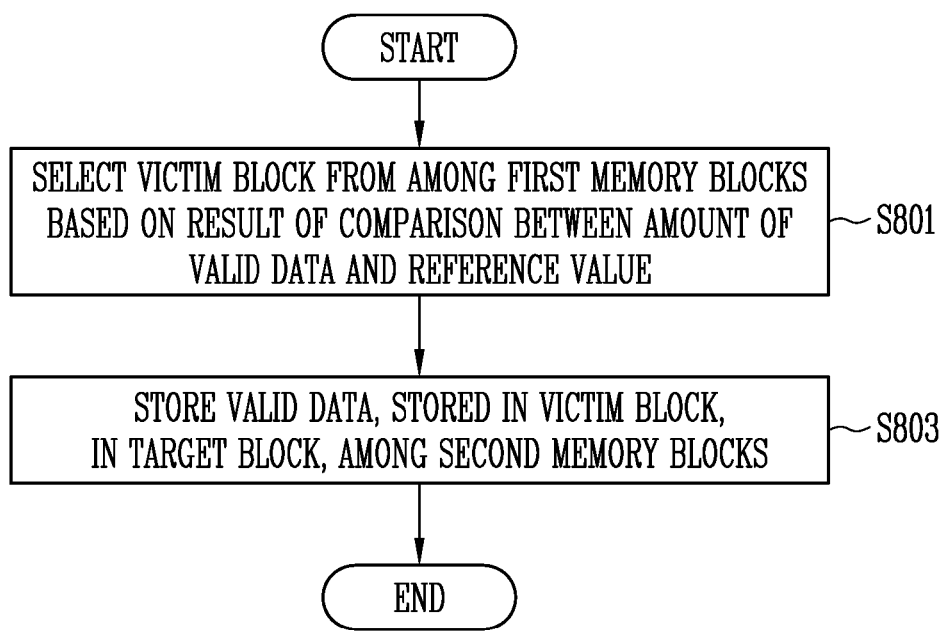
FIG. 8 is a flowchart illustrating garbage collection according to an embodiment of the present disclosure.

FIG. 8 is a flowchart illustrating garbage collection according to an embodiment of the present disclosure.

Referring to FIG. 8, at operation S801, the storage device may select a victim block from among first memory blocks based on the result of a comparison between the amount of valid data and a reference value. The storage device may select a memory block, in which the amount of valid data is less than or equal to the reference value, as the victim block, from among the first memory blocks. Each of the first memory blocks may include memory cells, each of which stores n bits (where n is a natural number of 2 or more).

At operation S803, the storage device may store the valid data, stored in the victim block, in a target block, among second memory blocks. Each of the second memory blocks may include memory cells, each of which stores m bits (where m is a natural number less than n). The target block may be a free block, among the second memory blocks.

Figure 9:
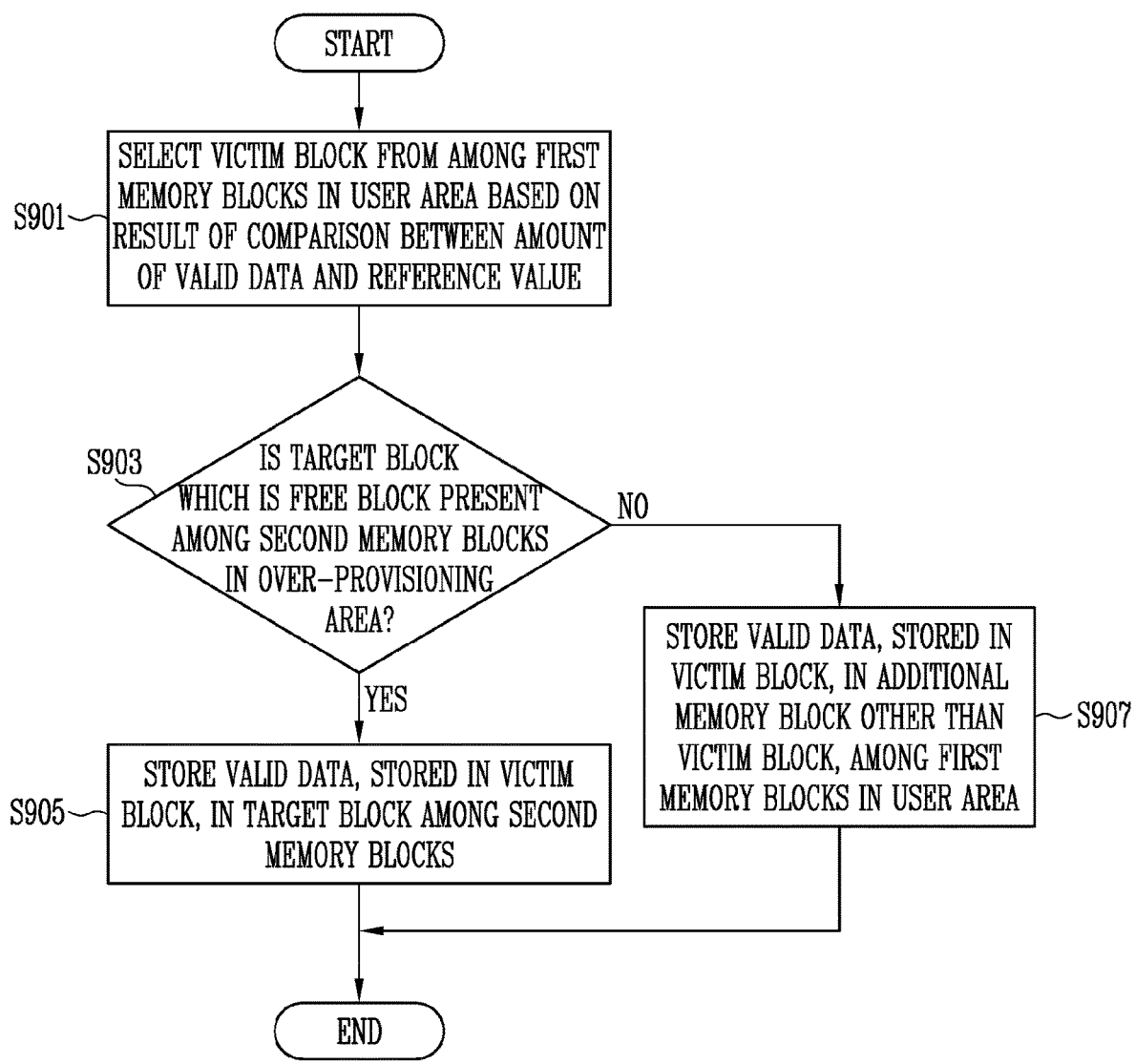
FIG. 9 is a flowchart illustrating garbage collection according to an embodiment of the present disclosure.

FIG. 9 is a flowchart illustrating garbage collection according to an embodiment of the present disclosure.

Referring to FIG. 9, the memory device may include a user area which stores data used by a user, and an over-provisioning area which is a reserved area required in order to maintain the operating performance of the storage device. In an embodiment, the user area may include one or more first memory blocks. The over-provisioning area may include one or more second memory blocks. Each of first memory blocks may include memory cells, each of which stores n bits (where n is a natural number of 2 or more). Each of second memory blocks may include memory cells, each of which stores m bits (where m is a natural number less than n).

At operation S901, the storage device may select a victim block from among the first memory blocks in the user area based on the result of a comparison between the amount of valid data and a reference value. The storage device may select a memory block, in which the amount of valid data is less than or equal to the reference value, as the victim block, from among the first memory blocks.

At operation S903, the storage device may determine whether a target block which is a free block is present among the second memory blocks in the over-provisioning area. When it is determined that the free block is present among the second memory blocks in the over-provisioning area, the process may proceed to operation S905, whereas when it is determined that no free block is present among the second memory blocks in the over-provisioning area, the process may proceed to operation S907.

At operation S905, the storage device may store the valid data, stored in the victim block, in the target block, among the second memory blocks in the over-provisioning area.

At operation S907, the storage device may store the valid data, stored in the victim block, in an additional memory block other than the victim block, among the first memory blocks in the user area. Here, the additional memory block may be a free block.

Figure 10:
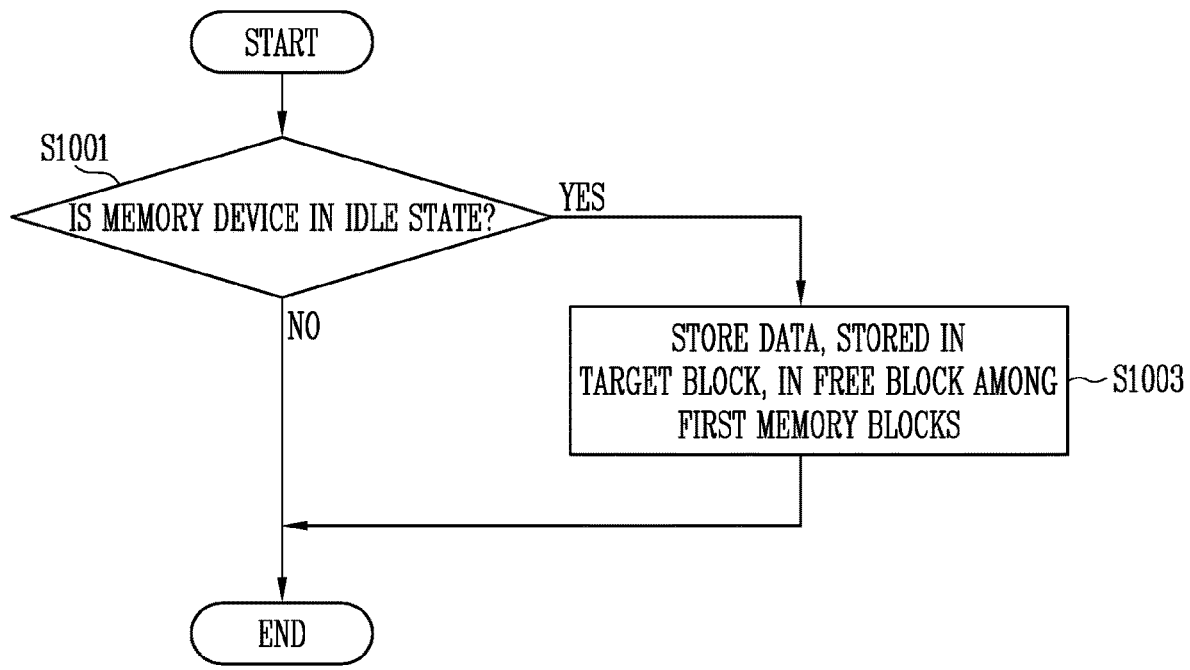
FIG. 10 is a flowchart illustrating migration according to an embodiment of the present disclosure.

FIG. 10 is a flowchart illustrating migration according to an embodiment of the present disclosure.

Referring to FIG. 10, at operation S1001, a storage device may determine whether a memory device is in an idle state. When it is determined that the memory device is in an idle state, the process may proceed to operation S1003, otherwise the process may be terminated. The idle state may be a state in which the memory device does not perform a command operation corresponding to a request from a host.

At operation S1003, the storage device may perform migration in which data stored in a target block, among second memory blocks, is stored in a free block, among first memory blocks.

Figure 11:
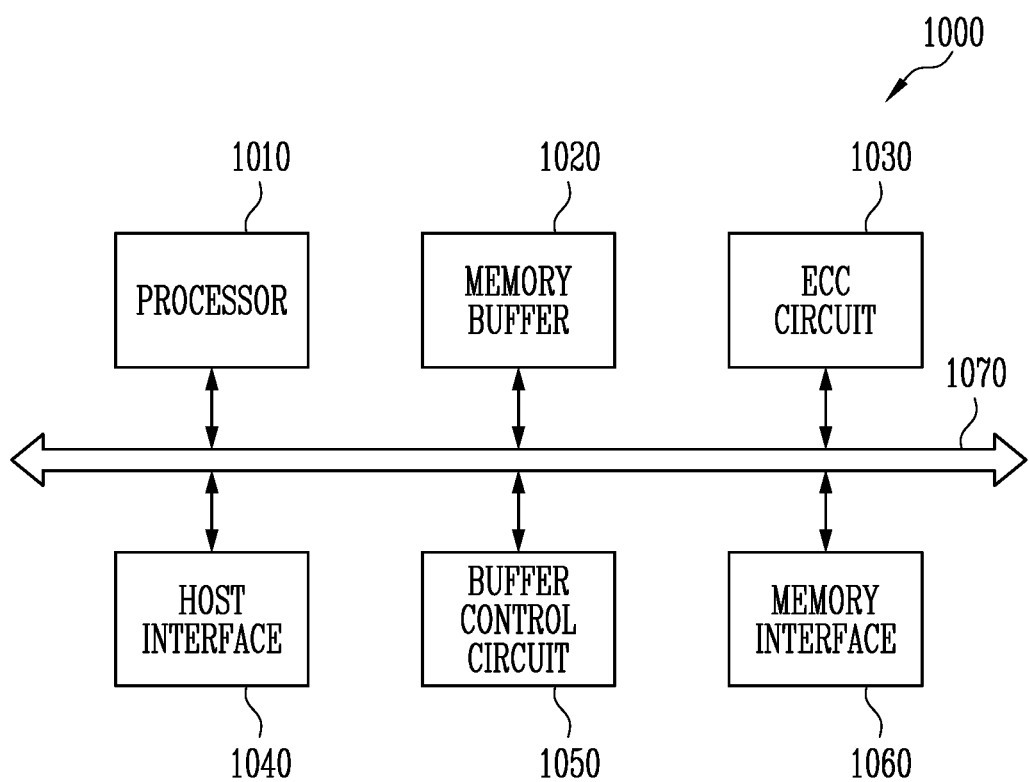
FIG. 11 is a diagram illustrating an embodiment of the memory controller, such as that of FIG. 1.

FIG. 11 is a diagram illustrating an embodiment of the memory controller of FIG. 1.

Referring to FIG. 11, a memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

The memory controller 1000 may include a processor 1010, a memory buffer 1020, an error correction circuit (Error Correcting Code: ECC circuit) 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may derandomize data received from the memory device during a read operation. For example, the processor 1010 may derandomize the data received from the memory device using a derandomizing seed. The derandomized data may be output to the host.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction. The ECC circuit 1030 may perform error correction code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 12:
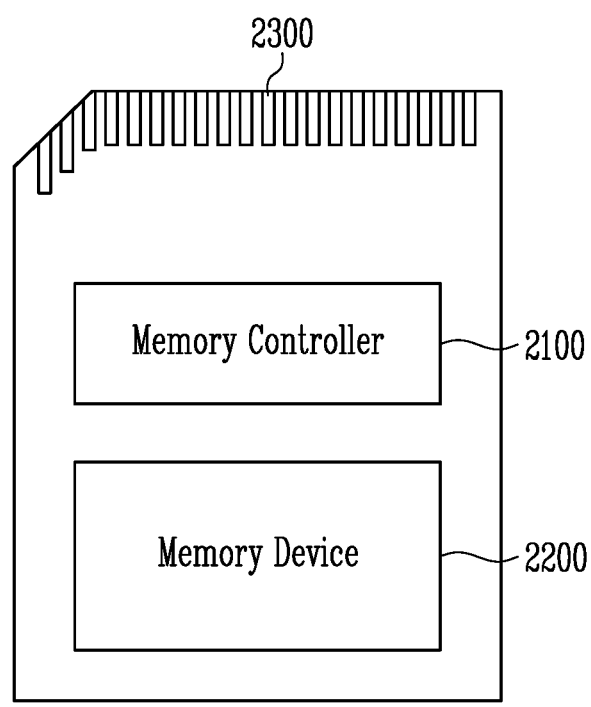
FIG. 12 is a block diagram illustrating a memory card system to which a storage device according to an embodiment of the present disclosure is applied.

FIG. 12 is a block diagram illustrating a memory card system to which the storage device according to an embodiment of the present disclosure is applied.

Referring to FIG. 12, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200 described above with reference to FIG. 1.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), a Spin-Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash card (CF), a smart media card (e.g., SM or SMC), a memory stick, a multimedia card (e.g., MMC, RS-MMC, MMCmicro or eMMC), a secure digital (SD) card (e.g., SD, miniSD, microSD, or SDHC), or a universal flash storage (UFS).

Figure 13:
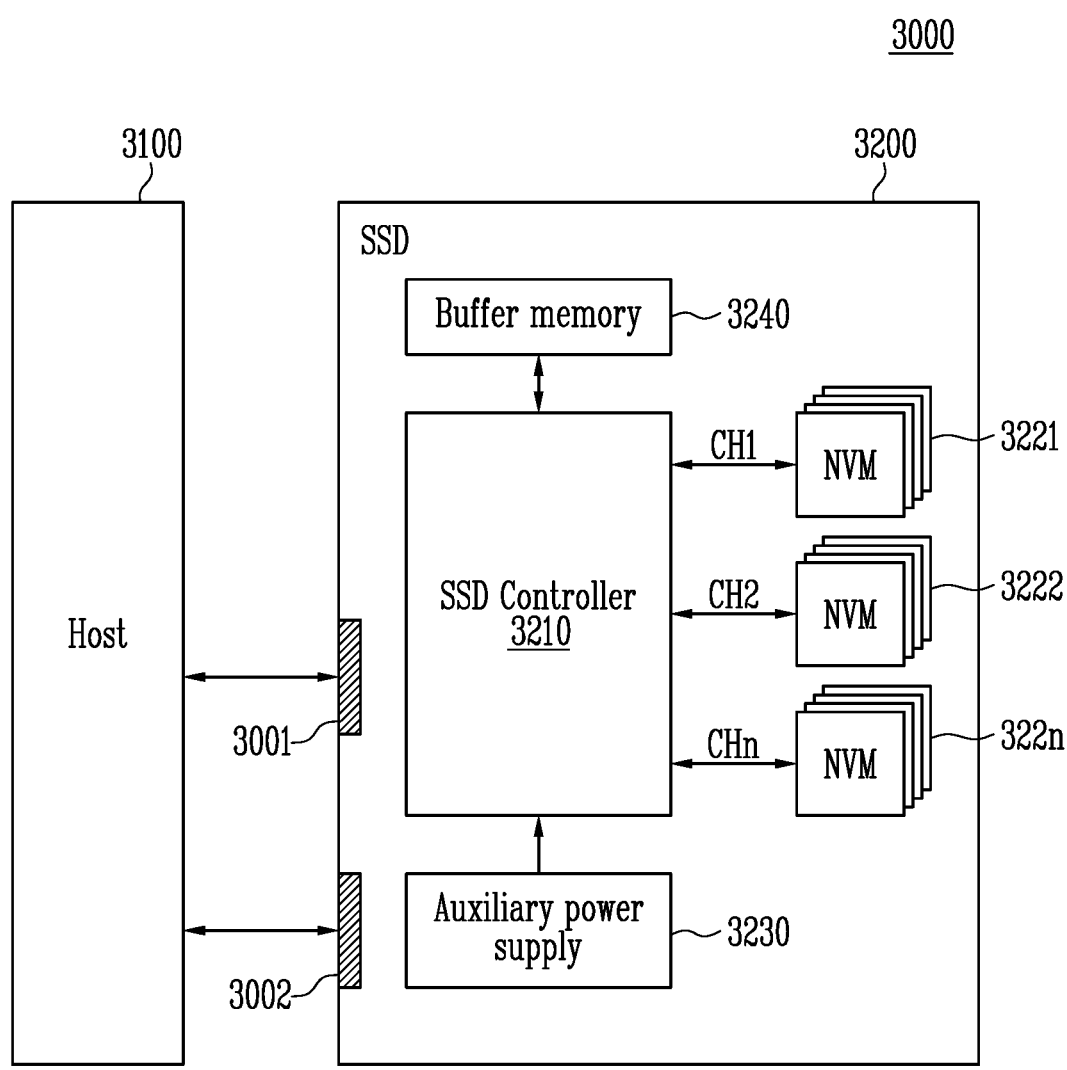
FIG. 13 is a block diagram illustrating a solid state drive (SSD) system to which a storage device according to an embodiment of the present disclosure is applied.

FIG. 13 is a block diagram illustrating a solid state drive (SSD) system to which the storage device according to an embodiment of the present disclosure is applied.

Referring to FIG. 13, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In accordance with an embodiment of the present disclosure, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 14:
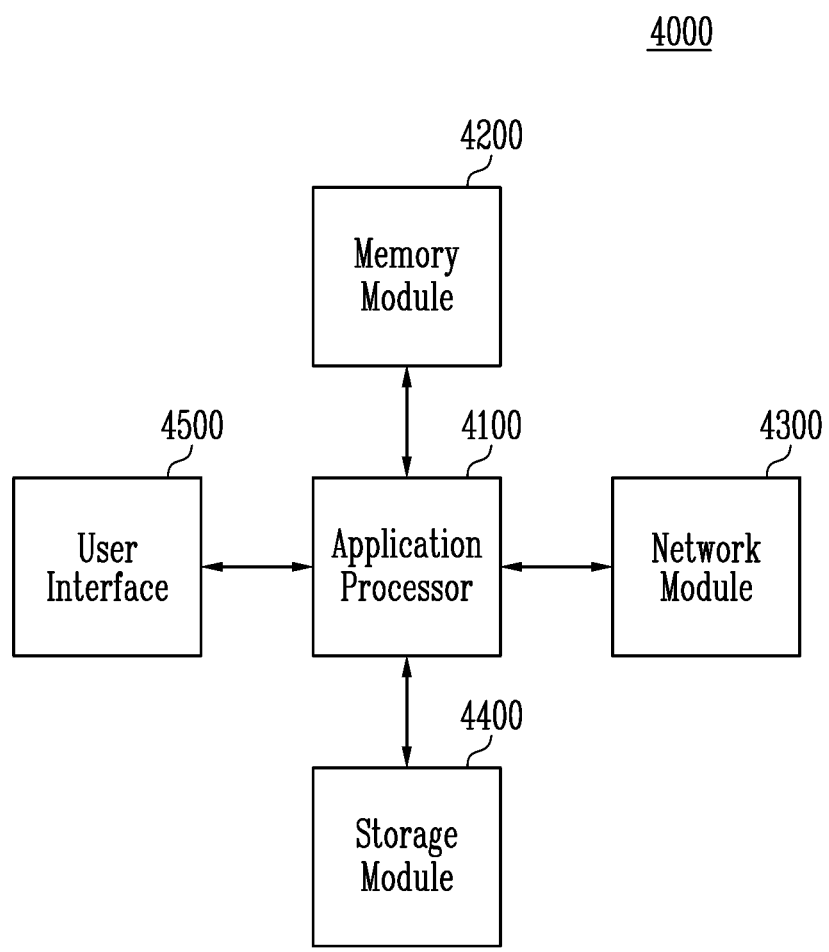
FIG. 14 is a block diagram illustrating a user system to which a storage device according to an embodiment of the present disclosure is applied.

FIG. 14 is a block diagram illustrating a user system to which the storage device according to an embodiment of the present disclosure is applied.

Referring to FIG. 14, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device 100 described above with reference to FIG. 1. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a liquid crystal display (LCD), an organic light emitting diode (OLED) display device, an active matrix OLED (AMOLED) display device, an LED, a speaker, and a monitor.

In accordance with the present disclosure, there are provided a storage device having improved garbage collection performance and a method of operating the storage device.

Examples of embodiments have been disclosed herein, and although specific terms are employed, the terms are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A storage device comprising:
   a memory device configured to include first memory blocks and second memory blocks; and
   a memory controller configured to control the memory device so that valid data stored in a victim block, among the first memory blocks, is stored in a target block, among the second memory blocks, based on a result of a comparison between an amount of valid data stored in the victim block and a reference value,
   wherein each of the first memory blocks includes memory cells each configured to store n bits, where n is a natural number of 2 or more,
   wherein each of the second memory blocks includes memory cells each configured to store m bits, where m is a natural number less than n,
   wherein memory cells which are included in the victim block are configured to store more bits than memory cells which are included in the target block, and
   wherein the reference value indicates ⅓ of a total amount of data stored in the victim block.

2. The storage device according to claim 1, wherein the memory controller comprises:
   a garbage collection controller configured to select the victim block from among the first memory blocks, select the target block from among the second memory blocks, and control the memory device so that the valid data stored in the victim block is stored in the target block.

3. The storage device according to claim 2, wherein the memory controller further comprises:
a block manager configured to store victim block information and target block information, wherein the victim block information indicates victim blocks in which an amount of valid data is less than or equal to the reference value, among the first memory blocks, and wherein the target block information indicates target blocks that are free blocks, among the second memory blocks.

4. The storage device according to claim 3, wherein the garbage collection controller is configured to select the victim block from among the first memory blocks based on the victim block information and to select the target block from among the second memory blocks based on the target block information.

5. The storage device according to claim 2, wherein the garbage collection controller is configured to control the memory device so that the valid data stored in the victim block is stored in a free block, among the first memory blocks, depending on whether a free block is present among the second memory blocks.

6. The storage device according to claim 2, wherein the memory controller further comprises:
a migration controller configured to control the memory device so that the valid data stored in the target block is stored in a free block, among the first memory blocks, depending on whether the memory device is in an idle state.

7. The storage device according to claim 1, wherein a number of the second memory blocks is fixed at a set value.

8. The storage device according to claim 1, wherein the memory device includes a user area in which user data is stored, and an over-provisioning area that is a reserved area required to maintain performance of the storage device.

9. The storage device according to claim 8, wherein:
the first memory blocks are included in the user area, and
the second memory blocks are included in the over-provisioning area.

10. A method of operating a storage device, which includes a memory device and a memory controller for controlling the memory device, the method comprising:
selecting a victim block from among first memory blocks, based on a result of a comparison between an amount of valid data stored in the victim block and a reference value; and
storing the valid data, stored in the victim block, in a target block, among second memory blocks,
wherein each of the first memory blocks includes memory cells each configured to store n bits, where n is a natural number of 2 or more,
wherein each of the second memory blocks includes memory cells each configured to store m bits, where m is a natural number less than n,
wherein memory cells which are included in the victim block are configured to store more bits than memory cells which are included in the target block, and
wherein the reference value indicates $\frac{1}{3}$ of a total amount of data stored in the victim block.

11. The method according to claim 10, wherein the selecting of the victim block comprises selecting a memory block in which the amount of valid data is less than or equal to the reference value, as the victim block, from among the first memory blocks.

12. The method according to claim 10, wherein the storing of the valid data in the target block comprises storing the valid data in the target block that is a free block, among the second memory blocks.

13. The method according to claim 10, further comprising:
storing the valid data in an additional memory block other than the victim block, among the first memory blocks, depending on whether a free block is present among the second memory blocks.

14. The method according to claim 10, further comprising:
storing the valid data, stored in the target block, in an additional memory block other than the victim block, among the first memory blocks, depending on whether the memory device is in an idle state.

15. The method according to claim 10, wherein a number of the second memory blocks is fixed at a set value.

16. The method according to claim 10, wherein the memory device includes a user area in which user data is stored, and an over-provisioning area that is a reserved area required to maintain performance of the storage device.

17. The method according to claim 16, wherein:
the first memory blocks are included in the user area, and
the second memory blocks are included in the over-provisioning area.

18. A memory system comprising:
a memory device configured to include a user area and an over-provisioning area; and
a memory controller configured to determine a victim block having a valid page count less than a reference value among first memory blocks in the user area, and to move data of the victim block into a target block among second memory blocks in the over-provisioning area,
wherein each of the user area and the over-provisioning area includes one or more of the first memory blocks and one or more of the second memory blocks,
wherein each first memory block stores two or more bits of data,
wherein each second memory block stores 1 bit of data,
wherein memory cells which are included in the victim block are configured to store more bits than memory cells which are included in the target block, and
wherein the reference value indicates $\frac{1}{3}$ of a total amount of data stored in the victim block.

* * * * *